RAIL VEHICLE WHEEL WITH ELASTICALLY SUPPORTED RIM
Filed Sept. 12, 1962 3 Sheets-Sheet 1
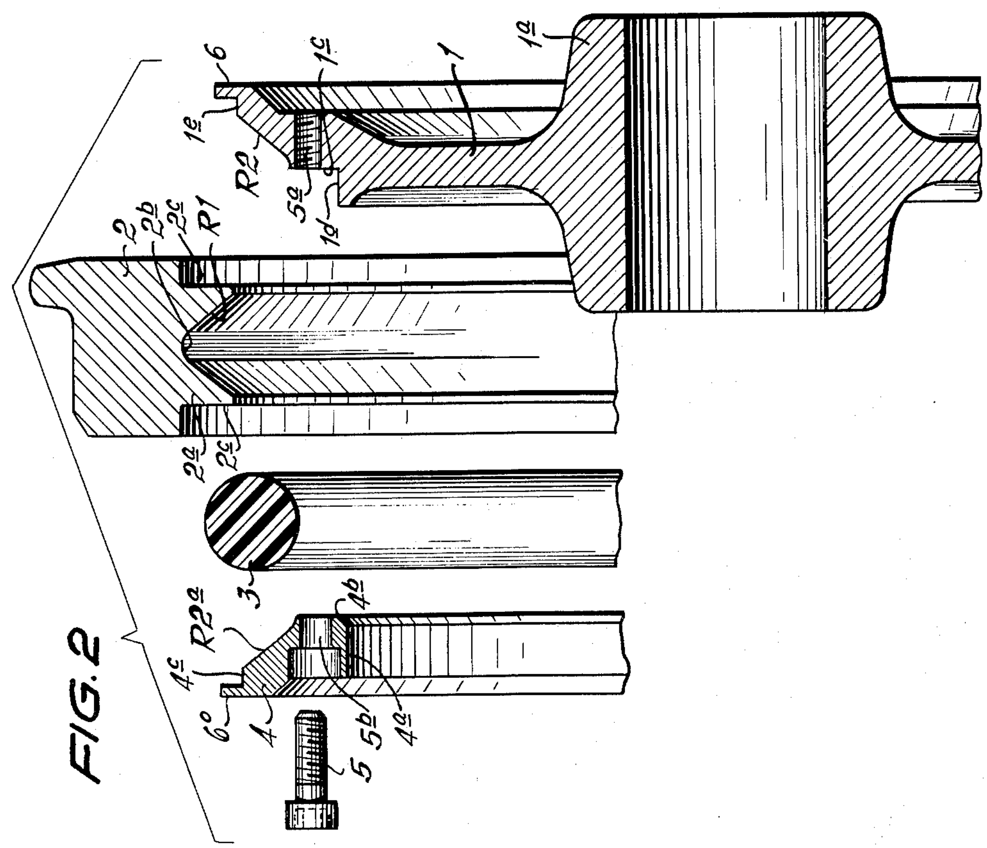
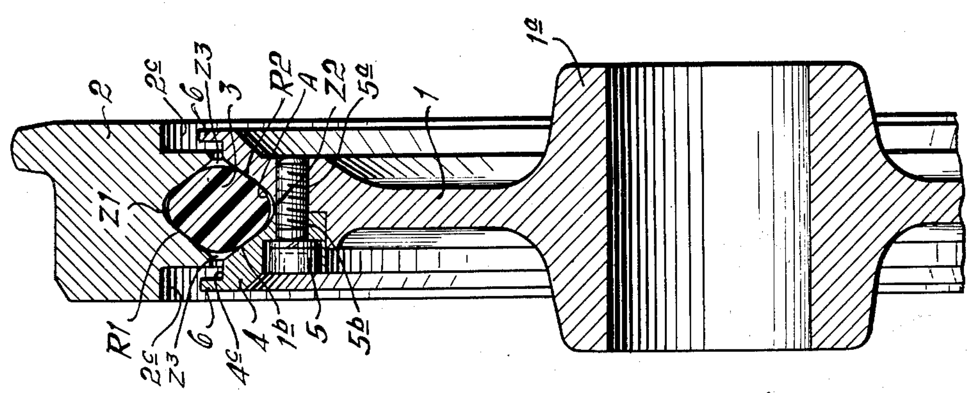
INVENTORS
H. Kordes & E. Schwietert
By Lowry & Rinehart
ATTYS.

RAIL VEHICLE WHEEL WITH ELASTICALLY SUPPORTED RIM

Filed Sept. 12, 1962 3 Sheets-Sheet 2

INVENTORS

H. Kordes & E. Schwietert

By Lowry & Rinehart

ATTYS.

RAIL VEHICLE WHEEL WITH ELASTICALLY SUPPORTED RIM
Filed Sept. 12, 1962 3 Sheets-Sheet 3
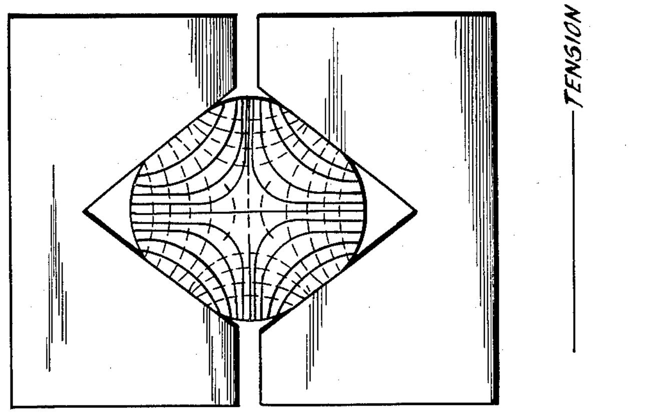
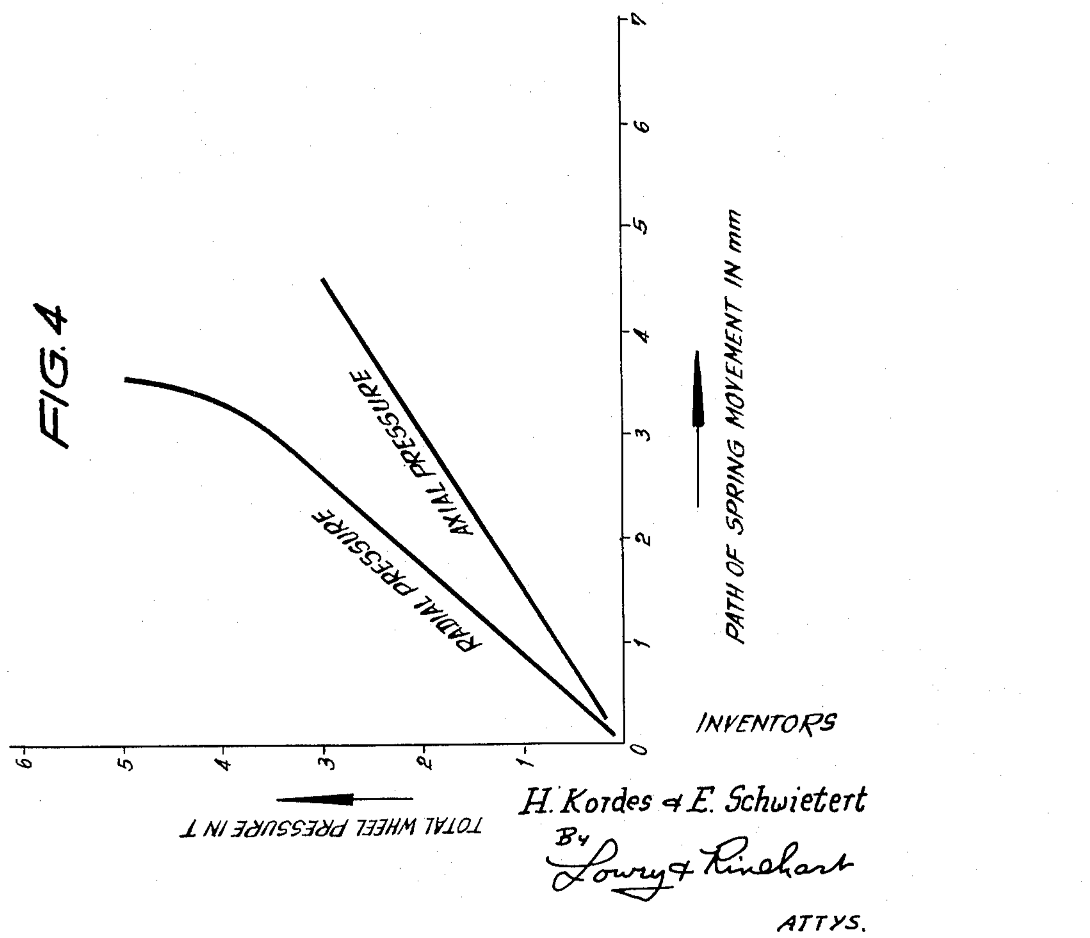

United States Patent Office 3,127,211

Patented Mar. 31, 1964

3,127,211

RAIL VEHICLE WHEEL WITH ELASTICALLY SUPPORTED RIM

Heinrich Kordes, 88 Augustenburgerstrasse, and Erich Schwietert, 78 Mindenerstrasse, both of Osnabruck, Germany Filed Sept. 12, 1962, Ser. No. 223,031
Claims priority, application Germany Sept. 14, 1961
1 Claim. (Cl. 295—11)

This invention relates to wheels, and more specifically to a rail vehicle wheel with elastically supported rim in which one or more elastic inserts are provided between the wheel body and the rim, the individual elastic inserts engaging both in grooves or the like in the wheel body and in grooves in the rim of the wheel.

It is the object of the present invention to improve the wheels of this known type.

This object is achieved according to the invention by providing a rail vehicle wheel with elastically supported rim which comprises a wheel body, a rim on said wheel body, at least one groove in said wheel body and said rim, said grooves tapering towards their bases, and an elastic insert engaging in said grooves in said wheel body and said rim and substantially completely embedded in said grooves, said elastic insert having a shape to leave free spaces between it and the bases of said grooves, into which spaces the material of said elastic insert can expand.

In a preferred form of construction the grooves have in cross section the form of a regular triangle the corners of which are preferably slightly rounded off. With a circular cross-sectional shape of the insert, this results not only in the provision of small spaces between the insert and the bases of the grooves but also in the provision of small spaces between the lateral walls of the grooves and the lateral faces of the elastic insert so that a sufficient amount of free space is available for the elastic insert to expand both in radial and in axial direction.

A wheel with an elastically supported rim as proposed by the invention has the advantage that owing to the absolutely reliable mounting of the elastic insert consisting e.g. of rubber, no high initial stresses are necessary which mostly are a prerequisite for an unobjectionable connection of the rim with the wheel body by means of the elastic insert. Thereby, in the case of the known wheels, the working capacity of the elastic insert is frequently considerably impaired. The subject matter of the invention provides the advantage that the movements of the elastic insert in the radial as well as in the axial direction are limited and accurately defined and this is in contrast to the known wheels of the kind specified above in which the elastic inserts can expand without being limited in one or several directions. By this measure overstressing of the elastic material under normal loads is practically prevented.

In an expedient form of construction the wheel body is made in two parts in a manner known per se by constructing the bifurcated upper portion of the wheel body in such a way that one annular leg together with the remaining wheel body forms a single part whereas the other annular leg can be screwed to the first leg, the screw connection permitting at the same time the desired initial stress to be adjusted.

It will be understood that the present technical teaching may also be applied to wheels provided with several elastic inserts. In this case it is merely necessary to provide several grooves in which the elastic inserts engage.

Two preferred embodiments of the invention will now be described by way of example and with reference to the accompanying drawings, in which:

FIG. 1 is a fragmentary cross section through a rail vehicle wheel with an elastically supported rim;

FIG. 2 is an exploded fragmentary cross sectional view of the wheel;

FIG. 4 is a diagram showing the paths of spring movement as a function of the wheel pressure, and FIG. 5 shows the courses of lines in a photoelastic diagram regarding the behaviour of the elastic insert when under tension and compression.

Figure 3:
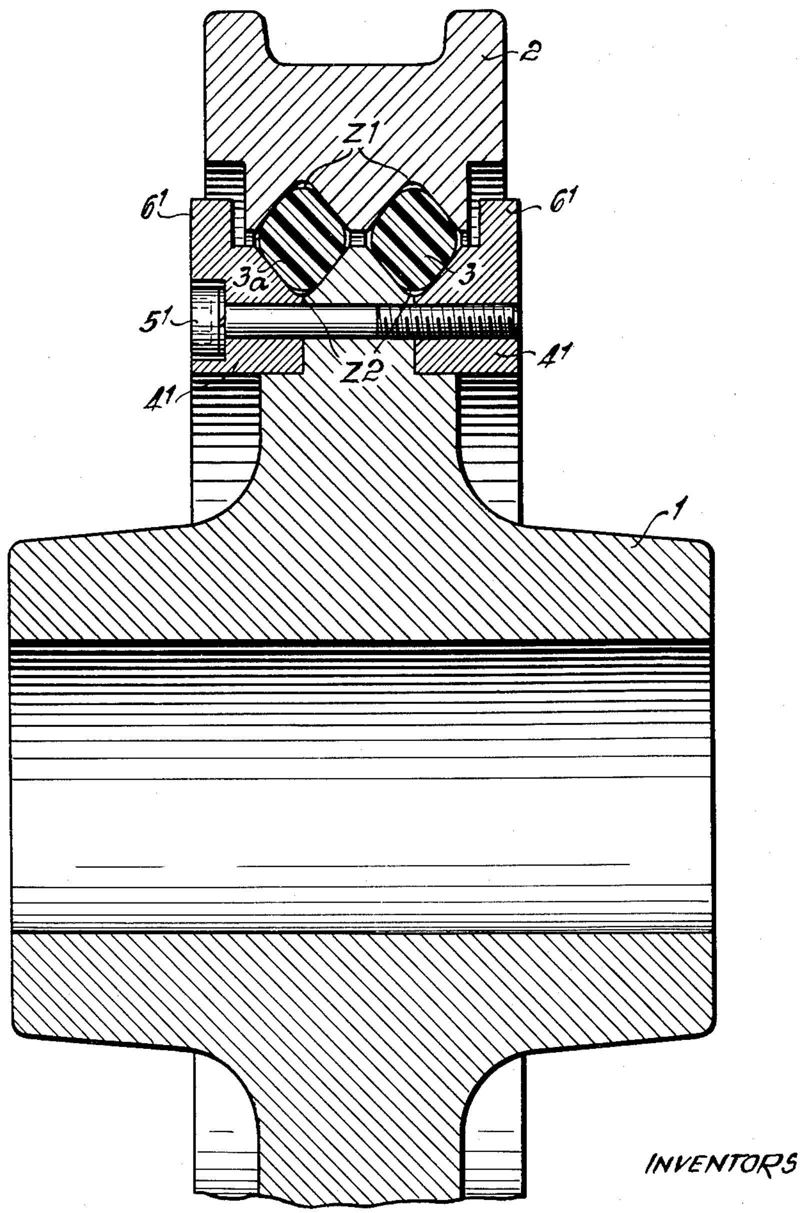
FIG. 3 is a fragmentary cross section through a wheel provided with two elastic inserts.

Referring to FIGS. 1 and 2, there is provided a wheel body 1 which is comprised of two parts. The first part includes a hub 1*a* and an outer annular edge 1*b* which is formed with a radial web 1*c* having a perpendicular shoulder 1*d* at its inner periphery. An annularly inclined face R2 extends outwardly from the top of web 1*c* and terminates in a shoulder 1*e* concentric with shoulder 1*d*, at the outer side of which is a lateral holding flange 6. The other part or component of the wheel comprises an annular holding ring 4 which includes a circular inner face 4*a* seating on shoulder 1*d* and a radial web 4*b* which is juxtaposed to web 1*c*. Webs 1*c* and 4*b* are provided with aligned bolt holes 5*a* and 5*b* through which extend bolts 5 for holding the parts in related assembly. Ring 4 also includes an outer shoulder 4*c* concentric with the circular face 4*a* and of a diameter equal to the shoulder 1*e*, and has an oppositely disposed offset face R2*a* having at its outer edge a lateral holding flange 6*a*, the faces R2 and R2*a* and the flanges 6 and 6*a* defining a substantially V-shaped groove having an arcuate apex A. An outer annular rim including an inner edge 2*a* is formed with a substantially V-shaped groove R1 having an arcuate apex 2*b* positioned over the periphery of the body, about an annular elastic body insert 3 of normally circular cross section, as best seen in FIG. 1. The radial space formed by the grooves is substantially rhombic in cross section and provides spaces Z1 and Z2 into which insert 3 can expand. Similarly, spaces Z3 are left between inner edge 2*a* and shoulders 1*e* and 4*c* to permit lateral expansion of insert 3. It is noted that the sides of edge 2*a* are recessed as at 2*c* providing an enlarged annular space into which flanges 6 and 6*a* project, but permitting limited lateral movement of the rim 2 relative to the wheel body 1.

In operation the cross section of the elastic insert 3 is deformed in such a manner that it adapts itself partially to the grooves in the wheel body 1 and the rim 2. Both on the occurrence of radial pressure and of lateral forces the elastic insert 3 has free surfaces which are elastically deformed when these forces become active.

In the case of the known wheel constructions the elastic inserts consist of elements of a definite shape exposed to more or less high edge stresses. With the subject matter of the present invention these inadmissibly high edge stresses are avoided and the elastic insert is uniformly stressed across its entire cross section, as photoelastic tests have shown and can be seen from FIG. 5.

The necessary degree of safety of the wheel is readily provided by the limitation of the paths of movement of the elastic insert 3. Lateral holding means 6 provided on the wheel body 1 prevent the rim 2 from axially shifting to a too great extent when excessive axial forces occur.

In the embodiment shown in FIG. 3 two elastic inserts 3 and 3*a* are provided. In this case two annular members 4$^1$ having lateral holding means 6$^1$ are connected by means of a single screw 5$^1$. By this mechanical limitation both in radial and in axial direction the elastic material is safely protected from being overstressed, which is not the case with most of the wheel constructions at present on the market since they all have no mechanical limitation.

It is desirable that the characteristic spring curve of a wheel of a rail vehicle having an elastically supported rim should take a progressive course. As experiments have shown, in the case of normal load the characteristic spring curve takes a rectilinear course as shown in FIG. 4. This characteristic spring curve is desirable for radial elasticity. Only when the normal load has been exceeded, the elasticity becomes highly progressive, i.e. the elastic insert behaves like an incompressible medium, since then the free spaces available for the elastic elements are almost filled. This is an advantage that is not inherent in the known constructions in which the high stresses have to be taken up by the adhering surface of the elastic element and may lead to fracture since there is no mechanical limitation.

The invention provides a wheel for a rail vehicle which comprises few parts, can be manufactured economically due to its simple construction, requires no fixing of the elastic element by vulcanization and is inexpensive both in its mounting and manufacture. A further advantage is seen to reside in the fact that when replacing the rims to be re-turned of internally mounted wheel sets, these wheel sets need not be dismantled.

The rim used in this wheel construction is free of shrinkage stresses. Thus, the relatively high shrinkage stresses are avoided. In the case of the rims shrunk on, to ensure the necessary security, there must remain a residual rim of a quite definite wall thickness. This is not necessary with the rim used according to the invention. The rim can be used further so that the running period thereof is increased.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description and all changes which come within the meaning and range of equivalency of the claim are therefore intended to be embraced therein.

We claim:

A rail vehicle wheel comprising, in combination, a body including a hub and an outer annular edge, said outer annular edge including a radial web lying in the plane of the body, a perpendicular shoulder at the inner periphery thereof, an angularly inclined offset face, said web having threaded bolt holes therein, a concentric shoulder at the outer extremity of said angularly offset portion and a lateral holding flange at the extremity of said concentric shoulder; an annular holding ring including a circular inner face seating on said perpendicular shoulder, a second radial web abutting said first-mentioned radial web, said second radial web having bolt holes therein aligned with said first-mentioned bolt holes, a second offset face inclined in a direction opposite said first-mentioned offset face, an outer shoulder concentric with said circular inner face and of a diameter equal to said concentric shoulder of said body and a second lateral holding flange at the extremity of said outer shoulder face, said offset faces defining a V-shaped groove having an arcuate apex; a rim including an inner edge of a thickness less than the space between said lateral holding flanges and a diameter slightly in excess of the outside diameter of said concentric and second shoulders to leave an annular space therebetween, said inner edge having a V-shaped groove having an arcuate apex therein conforming in size and configuration to the groove formed by said offset faces but opposed thereto forming a radial space of rhombic cross-section, an annular elastic body of normally circular cross-section seated in said opposed grooves; and bolts tightened through said aligned bolt holes compressing said elastic body to rhombic cross-section, the annular apices of said grooves and the space between said concentric second shoulders and said inner edge of said rim permitting limited deflection of the four edges of the prestressed deformed elastic body upon elastic movement of the wheel.

References Cited in the file of this patent

UNITED STATES PATENTS

| | | |
|---|---|---|
| 2,049,374 | Harter | July 28, 1936 |
| 2,203,965 | Nampa | June 11, 1940 |

FOREIGN PATENTS

| | | |
|---|---|---|
| 749,681 | France | May 8, 1933 |
| 850,761 | Germany | Sept. 29, 1952 |
| 2,540 | Great Britain | 1891 |